(12) United States Patent
Bedapudi et al.

(10) Patent No.: US 6,314,937 B1
(45) Date of Patent: Nov. 13, 2001

(54) INTERNAL COMBUSTION ENGINE AND METHOD FOR CONTROLLING THE PRODUCTION OF OXIDES OF NITROGEN

(75) Inventors: Prakash Bedapudi; Jeffrey S. LeBegue, both of Erie, PA (US); Erwin Peter Reichert, Alsdorf (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/596,977

(22) Filed: Jun. 20, 2000

(51) Int. Cl.[7] .................................. F02B 23/02; F16J 1/04
(52) U.S. Cl. .......................... 123/305; 123/294; 123/664
(58) Field of Search ............................ 123/27 R, 193.2, 123/294, 299, 300, 305, 657, 664, 666

(56) References Cited

U.S. PATENT DOCUMENTS

| | | |
|---|---|---|
| Re. 34,139 | 12/1992 | Cooper et al. . |
| 2,020,627 * | 11/1935 | Vincent ................................. 123/294 |
| 2,095,435 * | 10/1937 | Cummins ............................. 123/294 |
| 2,190,015 * | 2/1940 | Cummins ............................. 123/294 |
| 2,556,773 * | 6/1951 | Nichols .............................. 123/27 R |
| 2,657,677 * | 11/1953 | Graves .............................. 123/27 R |
| 3,489,130 | 1/1970 | Polidan et al. . |
| 3,586,338 | 6/1971 | Miklau et al. . |
| 3,620,137 | 11/1971 | Prasse . |
| 4,369,980 | 1/1983 | Backlin . |
| 4,474,147 | 10/1984 | Hoopes . |
| 4,480,844 | 11/1984 | Kozerski . |
| 4,620,710 | 11/1986 | Lambert et al. . |
| 4,770,134 | 9/1988 | Foreman et al. . |
| 5,058,488 | 10/1991 | Cullen et al. . |
| 5,112,066 | 5/1992 | Remmerfelt . |
| 5,341,779 | 8/1994 | Chen et al. . |
| 5,343,837 | 9/1994 | Ward et al. . |
| 5,553,585 | 9/1996 | Paro . |
| 5,603,515 | 2/1997 | Bock . |
| 5,692,468 | 12/1997 | Haman et al. . |
| 5,878,712 | 3/1999 | Wolters et al. . |

\* cited by examiner

*Primary Examiner*—Tony M. Argenbright
(74) *Attorney, Agent, or Firm*—Carl A. Rowold, Esq; David G. Maire, Esq; Beusse Brownlee Bowdoin & Wolter, PA

(57) ABSTRACT

A diesel locomotive engine (10) having a combustion chamber (30) formed into the cylinder head (16) to have a diameter ($D_2$) greater than the diameter ($D_1$) of the cylinder liner (14). A piston (20) is disposed for reciprocating motion in the cylinder. The piston has a top wall (36) with a convex surface to form a generally ring-shaped combustion volume. A fuel injection nozzle (28) directs a flow of fuel into the combustion chamber in a direction generally along a radius of the generally ring-shaped combustion volume at a pressure of more than 1800 bar in one embodiment. A cooling passage (42) is formed in the cylinder head to remove heat energy, thereby reducing the production of the oxides of nitrogen during engine operation.

21 Claims, 1 Drawing Sheet

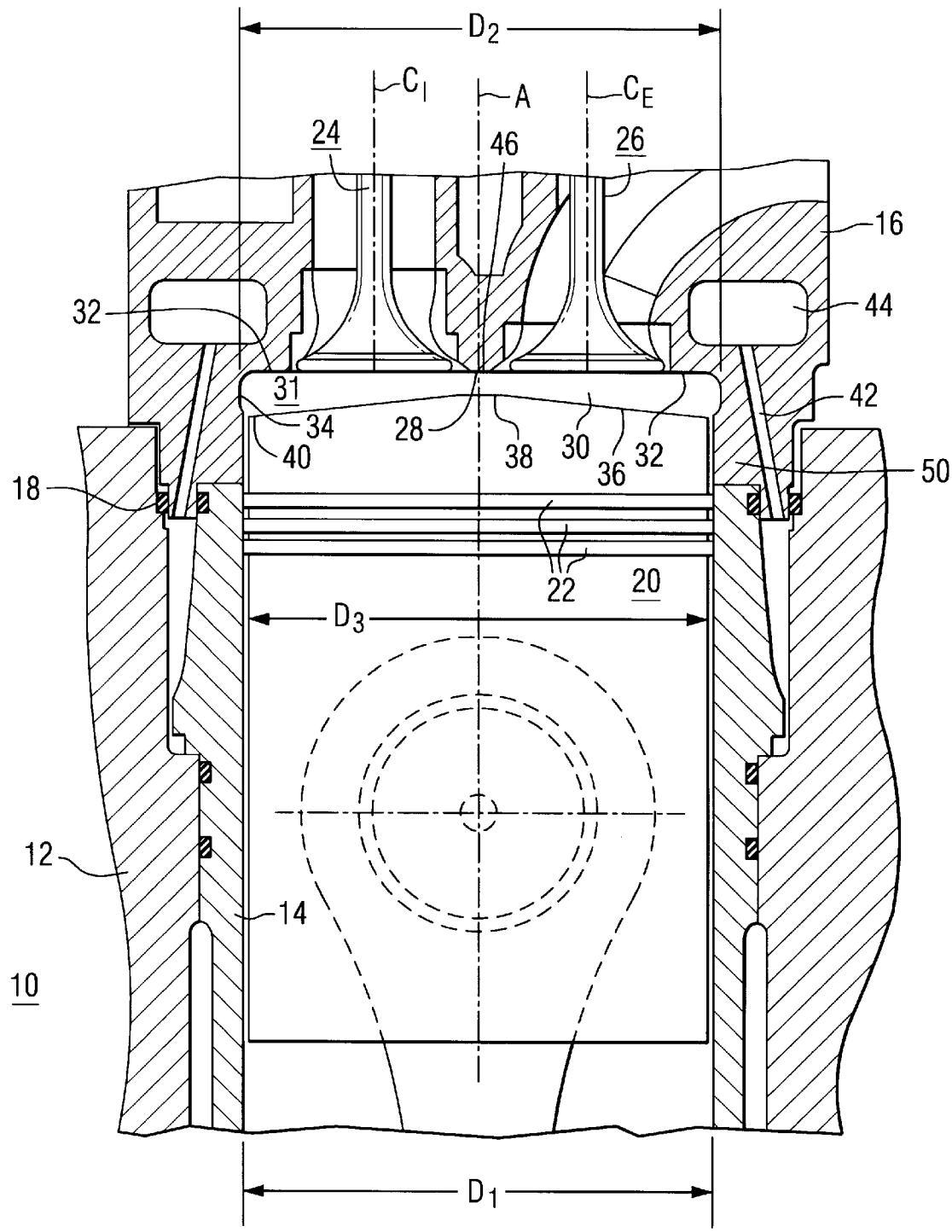

INTERNAL COMBUSTION ENGINE AND METHOD FOR CONTROLLING THE PRODUCTION OF OXIDES OF NITROGEN

BACKGROUND OF THE INVENTION

The present invention relates generally to internal combustion engines, and more particularly, to a combustion chamber design and method of operating an internal combustion engine, and specifically to a diesel locomotive engine and method of operating the same in compliance with the United States Environmental Protection Agency Tier-2 Emissions Standards.

It is well known to use a fuel injected diesel internal combustion engine as a power source for a locomotive. As a piston moves upward within a cylinder of a diesel engine, the air within the cylinder is compressed and heated. Fuel is injected into the combustion chamber as the piston nears its top dead center position. The fuel combusts with the compressed air, thereby providing energy for driving the engine and locomotive. There are many variables affecting the performance of a diesel engine, including the compression ratio, size of intake and exhaust valve openings, timing and duration of fuel injection, geometry of the combustion chamber, and peak temperature of the combustion gasses. In order to promote efficient operation of a diesel engine, it is known to optimize the size of both the intake and exhaust valve openings in order to reduce the pumping loop losses associated with the movement of the combustion and exhaust air. Because the cylinder wall is typically at a lower temperature than the piston top surface, it is also known to avoid the direct impingement of the injected fuel onto the cylinder wall because such fuel will not be completely oxidized during the combustion process. In order the minimize the loss of combustion heat through the cylinder wall and to minimize the amount of fuel that is impinged directly onto the cylinder wall, it is known to form a combustion chamber depression in the top surface of the piston in an area removed from the edges of the piston. One such design is illustrated in U.S. Pat. No. Re. 34,139 dated Dec. 8, 1992. An alternative design for maintaining the combustion gasses proximate the center of the piston is illustrated in U.S. Pat. No. 5,878,712 issued on Mar. 9, 1999. In this design a domed piston is provided with a dished depression which directs the combustion gasses away from the cylinder walls.

The United States Environmental Protection Agency has issued regulations directed to reducing the emissions from diesel locomotive engines. The Tier-2 Emissions Standards become effective on Jan. 1, 2005, and will require a significant reduction in the production of the oxides of nitrogen in diesel locomotive engines. While it is known to reduce the peak firing temperature in the combustion chamber of an internal combustion engine in order to reduce the production of the oxides of nitrogen, such a reduction in peak combustion temperature is known to result in a reduction in the efficiency of the engine operation.

BRIEF SUMMARY OF THE INVENTION

Thus there is a particular need for a design and method for operating a diesel engine for a locomotive that will result in a significant reduction in the production of oxides of nitrogen yet will not result in a significant reduction in the fuel efficiency and/or power output of the engine.

Accordingly, an internal combustion engine is described herein having: a cylinder having a first diameter about an axis; a cylinder head sealingly connected across a top of the cylinder; a combustion chamber formed in the cylinder head proximate the top of the cylinder, the combustion chamber having a second diameter about the axis that is greater than the first diameter; a piston disposed for reciprocating motion in the cylinder, the piston having a top wall comprising a convex surface whereby a center portion of the top wall projects closer to the combustion chamber than does an edge portion the top wall to form a generally ring shaped combustion volume when the piston approaches a top dead center position; an intake valve disposed in the cylinder head and opening into the combustion chamber; an exhaust valve disposed in the cylinder head and opening into the combustion chamber; a fuel injection nozzle disposed in the cylinder head proximate the axis.

BRIEF DESCRIPTION OF THE DRAWING

The features and advantages of the present invention will become apparent from the following detailed description of the invention when read with the accompanying drawing in which FIG. 1 illustrates one cylinder of a diesel locomotive engine. This engine has a combustion chamber formed to be integral with the cylinder head, with the combustion chamber having a diameter greater than the diameter of the cylinder.

DETAILED DESCRIPTION OF THE INVENTION

The figure illustrates a portion of an internal combustion engine 10 as may be utilized to power a locomotive. The figure illustrates a cross-sectional view of a single cylinder 12 of the engine 10. As is known in the art, engine 10 may have a plurality of such cylinders, and may be configured in a traditional V-12 design. In the embodiment of the figure, cylinder 12 includes a stainless steel liner 14 formed to have a first diameter $D_1$ about a longitudinal axis A. Other embodiments may not utilize a separate liner. A cylinder head 16 is sealingly connected across a top 18 of the cylinder 12. A piston 20 is disposed for reciprocating motion along axis A within the cylinder 12. The piston 20 is sealed against the cylinder liner 14 by a plurality of rings 22. Intake valves 24 and exhaust valves 26 are disposed in the cylinder head 16 proximate the top 18 of the cylinder 12. A fuel injection nozzle 28 is also disposed in the cylinder head 16 proximate the axis A.

A combustion chamber 30 is formed in the cylinder head 16 proximate the top 18 of cylinder 12. The combustion chamber 30 is defined in part by an open volume 31 formed in the cylinder head 16 to have a second diameter $D_2$ about the axis A that is greater than the first diameter $D_1$. The combustion chamber 30 is formed to have a relatively flat top wall 32 and a generally circular outer diameter wall 34. Intake valve 24 and exhaust valve 26 open into the combustion chamber 30 through the combustion chamber top wall 32. The second diameter $D_2$ may be formed to be 102–120% of the first diameter $D_1$, such as where the diameter of cylinder liner 14 is 25 cm. and the diameter of the combustion chamber 30 may be 25.5–30 cm. Preferably, the second diameter may be 105–111% of the first diameter, and it is believed that a design wherein the second diameter is about 108% of the first diameter would provide a good balance considering stress levels in the cylinder head, compression ratio, and physical layout restrictions. It may be appreciated that by forming combustion chamber 30 to have a diameter greater than the diameter of cylinder 12, the size of the intake and exhaust valves 24,26 may be increased accordingly, since valve diameter is generally limited by the overall cylinder diameter. Whereas in prior art designs, the diameter of the exhaust valve may typically be between 32–25% of the cylinder diameter, in the embodiment illustrated in the figure, the diameter of exhaust valve 26 may be between 35–40% of the first diameter $D_1$. Similarly, the diameter of the intake valve 24 may be at least 35–40% of the first diameter $D_1$. Unlike prior art engines, the center line of the intake valve $C_i$ and the center line of the exhaust valve $C_e$ may be disposed closer to the circumference of the cylinder than to the axis A as viewed along a line perpendicular to the axis A. Thus by spreading the valve center lines apart, additional room is provided along top wall 32 to provide valves that are relatively larger than are the prior art valves for a given cylinder diameter.

Piston 20 is formed to have a top wall 36 that is a convex surface whereby a center portion 38 of the top wall 36 projects closer to the combustion chamber 30 than does an edge portion 40 of the top wall 36. This convex surface forms a generally ring-shaped combustion volume when the piston 20 approaches a top dead center position. One may appreciate that the generally ring-shaped combustion volume will result in a greater heat loss to the cylinder head 16 and cylinder liner 14 than would be experienced in prior art designs wherein the combustion volume is concentrated near the center portion of the piston. This additional heat loss has the effect of lowering the peak combustion temperature in the combustion chamber 30, thereby reducing the production of the oxides of nitrogen during the operation of the engine. This additional heat energy may be removed by forming one or more cooling passages 42 in the cylinder head 16 proximate the outer diameter wall portion 44 of the combustion chamber 30. Coolant such as engine cooling water 44 may be circulated through the cooling passages 42 to remove such heat to the ambient environment.

In order to overcome the inherent reduction in efficiency resulting from the geometry of the combustion volume of the engine 10, the applicants have taken advantage of the additional distance provided between fuel injection nozzle 28 and the outer diameter wall 34. While prior art fuel injection nozzles were designed to direct the injection flow generally downward toward the combustion chamber formed near the center of the piston, the fuel injection nozzle 28 of the present invention is formed to inject fuel in a direction generally along a radius of the generally ring-shaped combustion volume and in a direction generally toward the outer diameter wall portion 34 of the combustion chamber 30. Fuel injection nozzle 28 may include a fuel jet 46 disposed to direct the flow of fuel at an angle of between 80° and 85° from the axis A. Such an angle provides the maximum distance between the fuel jet 26 and the point on the cylinder head 16 towards which the fuel is directed. To most fully take advantage of this increased distance, it is desirable to increase the pressure provided to the fuel injection nozzle 28 over that which is known in the prior art. In one embodiment the fuel is provided to injection nozzle 28 at a pressure of >1600 bar, or alternatively at a pressure of >1700 bar, or alternatively at a pressure of >1800 bar. Such increased pressures enable the fuel to be atomized to have an average particle size of no more than 30–80 microns SMD, or for example 35 microns at peak injection pressure SMD, as it is introduced into the combustion chamber 30. By providing such a fine fuel mist at such a high pressure, the total duration of the fuel injection flow may be reduced when compared to prior art engines. For example, the flow of fuel into combustion chamber 30 may be initiated when the piston 20 reaches a point of between 0–5° before top dead center position, and is terminated no later than the time when the piston 30 reaches a position of 25–30° after top dead center position. Thus, the combination of structures illustrated in the figure provides for a combustion process that is very efficient yet has a reduced peak temperature when compared with prior art designs.

The cylinder 16 may further be formed to include an anti-polishing ring 50 formed to be integral with the cylinder head. Anti-polishing rings are known to have a diameter less than the cylinder but more than the top of the piston so as to prevent the build-up of carbon and soot deposits around the top of the piston. The anti-polishing ring of prior art engines is normally designed as a separate structure that is attached to the cylinder liner. In the embodiment illustrated in the figure, the anti-polishing ring 50 is disposed below the combustion chamber 30 and is formed to have a third diameter $D_3$ less than the second diameter $D_2$. The combustion chamber 30 and integral anti-polishing ring 50 may be formed by the removal of material from a blank cylinder head using known machining processes.

In one embodiment, a diesel locomotive engine may have a 90 mm exhaust diameter, 92 mm intake valve diameter, 250 mm bore diameter, 1800 bar injection pressure, 270 mm chamber diameter, injector angle of 82 degrees with ten injector holes, an injection start at 3 degrees before TDC and injection end no later than 27 degrees after TDC, and a fuel flow rate of 2500 cubic mm per stroke.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An internal combustion engine comprising:
a cylinder having a first diameter about an axis;
a cylinder head sealingly connected across a top of the cylinder;
a combustion chamber formed in the cylinder head proximate the top of the cylinder, the combustion chamber having a second diameter about the axis that is greater than the first diameter;
a piston disposed for reciprocating motion in the cylinder, the piston having a top wall comprising a convex surface whereby a center portion of the top wall projects closer to the combustion chamber than does an edge portion of the top wall to form a generally ring shaped combustion volume when the piston approaches a top dead center position;
an intake valve disposed in the cylinder head and opening into the combustion chamber;
an exhaust valve disposed in the cylinder head and opening into the combustion chamber;
a fuel injection nozzle disposed in the cylinder head proximate the axis.

2. The engine of claim 1, further comprising:
a fuel jet formed in the fuel injection nozzle for directing a flow of fuel into the combustion volume so as to direct fuel in a direction generally along a radius of the generally ring shaped combustion volume toward an outer diameter wall portion of the combustion chamber.

3. The engine of claim 2, where the fuel jet is disposed to direct the flow of fuel at an angle of between 80 degrees and 85 degrees from the axis.

4. The engine of claim 1, wherein a diameter of the exhaust valve is between 35–40% of the first diameter.

5. The engine of claim 1, wherein a diameter of the intake valve is between 35–40% of the first diameter.

6. The engine of claim 1, wherein a center of the intake valve is disposed closer to a circumference of the cylinder than to the axis along a line perpendicular to the axis.

7. The engine of claim 1, wherein a center of the exhaust valve is disposed closer to a circumference of the cylinder than to the axis along a line perpendicular to the axis.

8. The engine of claim 1, further comprising a cooling passage formed in the cylinder head proximate an outer diameter wall portion of the combustion chamber.

9. The engine of claim 1, wherein the second diameter is between 102–120% of the first diameter.

10. The engine of claim 1, wherein the second diameter is between 105–111% of the first diameter.

11. The engine of claim 1, wherein the cylinder head further comprises an anti-polishing ring formed integral to the cylinder head, the anti-polishing ring being disposed below the combustion chamber and having a generally ring shape with a diameter less than the second diameter.

12. A method of controlling the production of oxides of nitrogen in a diesel engine, the engine comprising a cylinder having a first diameter about an axis, a cylinder head sealingly connected across a top of the cylinder, a piston disposed for reciprocating motion along the axis in the cylinder, an intake valve and an exhaust valve disposed in the cylinder head proximate the cylinder top, and a fuel injection nozzle disposed in the cylinder head proximate the axis, the method comprising the steps of:

forming a combustion chamber in the cylinder head proximate the top of the cylinder, the combustion chamber having a diameter about the axis greater than the first diameter;

providing a top wall on the piston comprising a convex surface whereby a center portion of the top wall projects closer to the combustion chamber than does an edge portion of the top wall to form a generally ring shaped combustion volume when the piston approaches a top dead center position;

injecting a flow of fuel into the combustion volume from the fuel injection nozzle in a direction generally along a radius of the generally ring shaped combustion volume toward an outer diameter wall portion of the combustion chamber.

13. The method of claim 12, further comprising the step of providing fuel to the fuel injection nozzle at a pressure of greater than 1600 bar.

14. The method of claim 12, further comprising the step of providing fuel to the fuel injection nozzle at a pressure of greater than 1700 bar.

15. The method of claim 12, further comprising the step of providing fuel to the fuel injection nozzle at a pressure of greater than 1800 bar.

16. The method of claim 12, wherein the step of injecting a flow of fuel comprises spraying fuel with an average particle size of no more than 30–80 microns SMD into the combustion chamber.

17. The method of claim 16, further comprising the step of providing fuel to the fuel injection nozzle at a pressure of greater than 1600 bar.

18. The method of claim 12, wherein the step of injecting a flow of fuel comprises initiating fuel injection no earlier than the time when the piston reaches a 5 degree before top dead center position and terminating fuel injection no later than the time when the piston reaches a 30 degree after top dead center position.

19. The method of claim 12, further comprising the steps of:

forming a cooling passage in the cylinder head proximate the outer diameter wall portion of the combustion chamber; and passing coolant through the cooling passage to remove heat energy from the cylinder head.

20. The method of claim 12, further comprising the step of providing a diameter of the intake valve to be between 35–40% of the first diameter.

21. The method of claim 12, further comprising the step of providing a diameter of the exhaust valve to be between 35–40% of the first diameter.

* * * * *